(12) United States Patent
Yi et al.

(10) Patent No.: US 11,256,225 B2
(45) Date of Patent: Feb. 22, 2022

(54) DATA TRANSMISSION APPARATUS OF CIRCUIT BREAKER CONTROLLER

(71) Applicants: SEARI ELECTRIC TECHNOLOGY CO., LTD., Shanghai (CN); ZHEJIANG CHINT ELECTRICS CO., LTD., Yueqing (CN)

(72) Inventors: Xianjun Yi, Shanghai (CN); Lijun Chen, Shanghai (CN); Ying Jun Yin, Shanghai (CN)

(73) Assignees: SEARI ELECTRIC TECHNOLOGY CO., LTD., Shanghai (CN); ZHEJIANG CHINT ELECTRICS CO., LTD., Yueqing (CN)

(*) Notice: Subject to any disclaimer, the term of this patent is extended or adjusted under 35 U.S.C. 154(b) by 342 days.

(21) Appl. No.: 16/319,413

(22) PCT Filed: Jul. 3, 2017

(86) PCT No.: PCT/CN2017/091419
§ 371 (c)(1),
(2) Date: Jan. 21, 2019

(87) PCT Pub. No.: WO2018/014715
PCT Pub. Date: Jan. 25, 2018

(65) Prior Publication Data
US 2019/0265667 A1    Aug. 29, 2019

(30) Foreign Application Priority Data

Jul. 22, 2016 (CN) .......................... 201610583648.5

(51) Int. Cl.
*G05B 19/042* (2006.01)
*H02H 1/00* (2006.01)
(Continued)

(52) U.S. Cl.
CPC ....... *G05B 19/0428* (2013.01); *G05B 19/042* (2013.01); *H01H 71/00* (2013.01);
(Continued)

(58) Field of Classification Search
CPC . H01H 71/00; H02H 3/00; H04B 1/04; H04B 1/40
(Continued)

(56) References Cited

U.S. PATENT DOCUMENTS 3,555,355 A * 1/1971 Pfister .................... H02H 3/085
361/27
4,698,517 A * 10/1987 Tohya ..................... G05F 1/577
307/43
(Continued)

FOREIGN PATENT DOCUMENTS

CN    101807072 A    8/2010
CN    102148529 A    8/2011
(Continued)

OTHER PUBLICATIONS

International Search Report issued in corresponding International Application No. PCT/CN2017/091419 dated Sep. 18, 2017 (3 pages).
(Continued)

*Primary Examiner* — Md Azad
(74) *Attorney, Agent, or Firm* — Osha Bergman Watanabe & Burton LLP

(57) ABSTRACT

The present invention discloses a data transmission apparatus of a circuit breaker controller. The data transmission apparatus comprises: a first component having a first power supply and a second component having a second power supply. The first component and the second component share a storage device. The second component is connected to a main circuit of the circuit breaker controller. The second
(Continued)

component collects parameters of the main circuit and stores the parameters in the storage device. The second power supply powers the second component and is powered by the main circuit. The first component is connected to a communication device. The first component establishes data transmission between the communication device and the storage device. The first power supply powers the first component and is powered by an external power supply. The second power supply is connected to the first power supply and transmits a control signal to the first power supply.

18 Claims, 5 Drawing Sheets

(51) Int. Cl.
　　*H04B 1/04*　　　(2006.01)
　　*H04B 1/40*　　　(2015.01)
　　*H02H 3/00*　　　(2006.01)
　　*H01H 71/00*　　(2006.01)
(52) U.S. Cl.
　　CPC ............ *H02H 1/0061* (2013.01); *H02H 3/00* (2013.01); *H04B 1/04* (2013.01); *H04B 1/40* (2013.01); *G05B 2219/21154* (2013.01)
(58) Field of Classification Search
　　USPC .......................................................... 700/293
　　See application file for complete search history.

(56) References Cited

U.S. PATENT DOCUMENTS

| | | | |
|---|---|---|---|
| 9,069,541 | B2 | 6/2015 | Kent et al. |
| 2003/0099147 | A1* | 5/2003 | Deng ................... G11C 7/1006 365/230.05 |
| 2010/0123990 | A1 | 5/2010 | Gass et al. |
| 2017/0282816 | A1* | 10/2017 | Kozuka ............... B60R 16/0231 |

FOREIGN PATENT DOCUMENTS

| | | |
|---|---|---|
| CN | 201946520 U | 8/2011 |
| CN | 202333991 U | 7/2012 |
| CN | 103339580 A | 10/2013 |
| CN | 203643580 U | 6/2014 |
| CN | 205427522 U | 8/2016 |
| CN | 205862163 U | 1/2017 |

OTHER PUBLICATIONS

Written Opinon issued in corresponding International Application No. PCT/CN2017/091419 dated Sep. 18, 2017 (4 pages).

Office Action issued in corresponding Chinese Application No. 201610583648.5 dated Feb. 19, 2019, and English translation thereof (20 pages).

* cited by examiner

DATA TRANSMISSION APPARATUS OF CIRCUIT BREAKER CONTROLLER

BACKGROUND OF THE INVENTION

1. Field of the Invention

The present invention relates to the field of low voltage electrical appliances, and more particularly to a circuit breaker controller having a communication function.

2. The Related Art

With the continuous improvement of the low-voltage electrical industry, molded case circuit breakers are becoming more intelligent and communicable. Currently, circuit breaker controllers on the market generally do not have a universal data transmission function. If it is necessary to read the data in the circuit breaker controller, according to the conventional method, it is necessary to use a dedicated communication device and a specific communication command in order to operate the circuit breaker controller. Reading data is very inconvenient when a field device is faulty.

FIG. 1 discloses a schematic diagram of data transmission for a circuit breaker controller according to prior art. As shown in FIG. 1, the circuit breaker controller has a component 100 for collecting and storing data. Component 100 includes a power supply 102, a sampling circuit 104, a controller 106, and a storage device 108. The power supply 102 is connected to the main circuit of the circuit breaker controller and is powered by the main circuit. The power supply 102 supplies power to other components in the component 100. The sampling circuit 104 is connected to the main circuit of the circuit breaker controller, and the sampling circuit 104 collects parameters in the main circuit. The controller 106 is connected to the sampling circuit 104 and the storage device 108. The controller 106 controls the sampling circuit 104 to store the acquired parameters into the storage device 108. The controller 106 is capable of accessing the storage device 108. When the data in the storage device 108 needs to be read, a dedicated interface circuit 110 is used. The dedicated interface circuit 110 is connected on one hand to an external communication device, such as a personal computer (PC), and on the other hand to the controller 106. The dedicated interface circuit 110 and the controller 106 communicate with a specific communication command through a designated communication protocol, and the controller 106 reads the required data from the storage device 108, compiles and transmits it according to a specified communication protocol, and acquires it on the PC. The data is then restored to obtain data in storage device 108.

The defects of this data transmission mode are obvious: 1) Both the controller and the storage device are powered by the power supply, and the controller and the storage device can work normally only when the power supply is working. However, the power supply is powered by the main circuit of the circuit breaker controller. In the case of a field failure, the main circuit of the circuit breaker controller is usually in the off state, so the power supply cannot work, which causes the controller and the storage device to be inoperable, which causes obstacles to the handling of the field failure. 2) A dedicated interface circuit and a dedicated communication protocol are required. Data communication is not possible without a dedicated interface circuit or without a dedicated communication protocol on the PC.

SUMMARY

Embodiments of the present invention provide a data transmission apparatus of circuit breaker controller. The data transmission apparatus comprises a first component having a first power supply and a second component having a second power supply. The first component and the second component share a storage device. The second component is connected to a main circuit of the circuit breaker controller. The second component collects parameters of the main circuit and stores the parameters in the storage device, the second power supply powers the second component and is powered by the main circuit. The first component is connected to a communication device, the first component establishes data transmission between the communication device and the storage device, the first power supply powers the first component and is powered by an external power supply. The second power supply is connected to the first power supply and transmits a control signal to the first power supply.

According to an embodiment, the second component comprises: the second power supply, a sampling circuit, a controller and the storage device. The second power supply is connected in the main circuit of the circuit breaker controller, and the second power supply supplies power to each element of the second component when the main circuit is switched on. The sampling circuit is connected to the main circuit of the circuit breaker controller, and the sampling circuit collects parameters of the main circuit. The controller is connected to the sampling circuit and the storage device, the parameters collected by the sampling circuit are processed by the controller and stored in the storage device.

According to an embodiment, the first component comprises: the first power supply, a connection interface, an interface circuit, and the storage device. The first power supply is powered by the external power supply through the connection interface, and the first power supply supplies power to each element of the first component. The connection interface is connected to the communication device and/or the external power supply. The interface circuit is connected to the first power supply, the connection interface and the storage device, the first power supply supplies power to the storage device through the interface circuit, the connection interface and the interface circuit establish data transmission between the communication device and the storage device.

According to an embodiment, the second power supply transmits a control signal to the first power supply when the controller communicates with the storage device, the first power supply is switched off so that the interface circuit is disconnected with the storage device According to an embodiment, the communication device can only read data in the storage device through the connection interface and the interface circuit.

According to an embodiment, an input end of the first power supply is connected to ground through a switch transistor, the input end of the first power supply is further connected to a supply end of the connection interface, and an output end of the second power supply is connected to the switch transistor. The output end of the second power supply outputs a high level, and the switch transistor is switched on, the input end of the first power supply is connected to ground so that the first power supply is switched off. The output end of the second power supply outputs a low level, and the switch transistor is switched off, the input end of the first power supply is connected to the supply end of the connection interface, and the first power supply is controlled by the supply end of the connection interface.

According to an embodiment, one write protection control pin of a chip of the interface circuit is provided with a high level and another write protection control pin is provided with a low level so as to form a writing protection circuit, so that the interface circuit can only read the storage device.

According to an embodiment, a power input end of a chip of the storage device is respectively connected to the output end of the second power supply and an output power supply pin of the chip of the interface circuit through respective diodes. The output end of the second power supply outputs a high level, and supplies power to the chip of the storage device through the diode, the first power supply is switched off, and the output power supply pin of the chip of the interface circuit does not output a power supply level. The output end of the second power supply outputs a low level, the first power supply is switched on, and the output power supply pin of the chip of the interface circuit outputs the power supply level to supply power to the chip of the storage device.

According to an embodiment, chip select signal pins of the chip of the storage device are respectively connected to a chip select output control pin of the controller and a chip select output control pin of the chip of the interface circuit through respective diodes. The output end of the second power supply outputs a high level, the first power supply is switched off, the chip select output control pin of the controller outputs a chip select signal, while the chip select output control pin of the chip of the interface circuit does not output a chip select signal, so that the chip of the storage device selects to communicate with the controller. The output end of the second power supply outputs a low level, the first power supply is switched on, the chip select output control pin of the controller does not output the chip select signal, while the chip select output control pin of the chip of the interface circuit outputs the chip select signal, so that the chip of the storage device selects to communicate with the interface circuit.

According to an embodiment, read enable control pins of the chip of the storage device are respectively connected to a read enable control pin of the controller and a read enable control pin of the chip of the interface circuit through respective diodes. The output end of the second power supply outputs a high level, the first power supply is switched off, the read enable control pin of the controller outputs a read enable signal, while the read enable control pin of the chip of the interface circuit does not output a read enable signal, so that the chip of the storage device is read by the controller. The output end of the second power supply outputs a low level, the first power supply is switched on, the read enable control pin of the controller does not output the read enable signal, while the read enable control pin of the chip of the interface circuit outputs the read enable signal, so that the chip of the storage device is read by the chip of the interface circuit.

According to an embodiment, a write protection pin of the chip of the storage device is connected to the output end of the second power supply. The output end of the second power supply outputs a high level, the write protection pin of the chip of the storage device is connected to the high level, and the chip of the storage device allows writing. The output end of the second power supply outputs a low level, the write protection pin of the chip of the storage device is connected to the low level, and the chip of the storage device does not allow writing.

According to an embodiment, a write enable pin of the chip of the storage device is connected to a write enable control pin of the controller and is connected to ground through a resistor. The output end of the second power supply outputs a high level, the write enable pin of the chip of the storage device determines whether to enable writing according to a control signal of the write enable control pin of the controller. The output end of the second power supply outputs a low level, the write enable pin of the chip of the storage device is grounded and is inputted with a low level, the chip of the storage device does not enable writing.

According to an embodiment, a state indication signal pin of the chip of the storage device is connected to the output end of the second power supply through a resistor, and is also connected to an IO port of the controller. The chip of the storage device is in a busy state, a low level is outputted and provided to the IO port of the controller, and the controller is standby. The chip of the storage device is in an idle state, a high level is outputted and provided to the IO port of the controller, and the controller enables operation.

According to an embodiment, a command latch control pin of the chip of the storage device is connected to a command latch control pin of the controller. An address latch control pin of the chip of the storage device is connected to an address latch control pin of the controller.

Embodiments of the present invention provide a data transmission method of circuit breaker controller. The method comprises: collecting parameters of the main circuit and storing the parameters in a storage device, the collecting and storing is powered by a second power supply and the second power supply is powered by the main circuit; establishing data transmission between a communication device and the storage device, the data transmission is powered by a first power supply and the first power supply is powered by an external power supply.

According to an embodiment, the communication device is connected to the storage device through a connection interface and an interface circuit, and the data transmission is established between the communication device and the storage device. The first power supply is connected to the external power supply through the connection interface.

According to an embodiment, the connection interface is a USB interface, and the interface circuit is a USB interface circuit.

According to an embodiment, during the storage of the parameters to the storage device, the second power supply transmits a control signal to the first power supply, the first power supply is switched off so as to disconnect the data transmission between the communication device and the storage device.

According to an embodiment, the communication device can only read data from the storage device.

The data transmission apparatus of circuit breaker controller of the present invention comprises two components, each of which has an independent power supply but share a common storage device. The component connected to a main circuit is powered by the main circuit, the component collects parameters of the main loop and stores them in the storage device. The component connected to a communication device uses a universal interface, the component is powered by an external power supply and is able to provide data transmission over a common interface. A data transmission device of the circuit breaker controller is capable of acquiring data in the storage device by means of an external power supply in the case where the main circuit is disconnected, and can use a universal interface such as USB to facilitate field operation.

BRIEF DESCRIPTION OF THE DRAWINGS

The above and other features, natures, and advantages of the invention will be apparent by the following description of the embodiments incorporating the drawings, wherein.

DETAILED DESCRIPTION OF EMBODIMENTS

Figure 1:
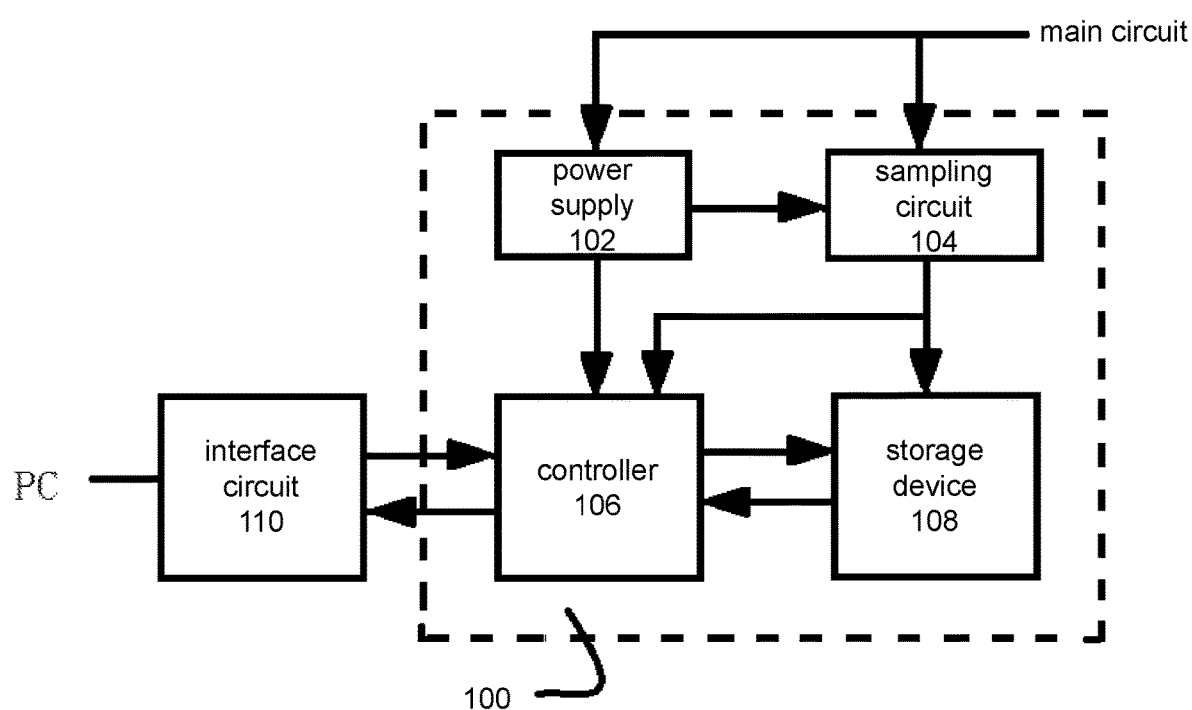
FIG. 1 illustrates a schematic diagram of data transmission for a circuit breaker controller according to prior art.
Figure 2:
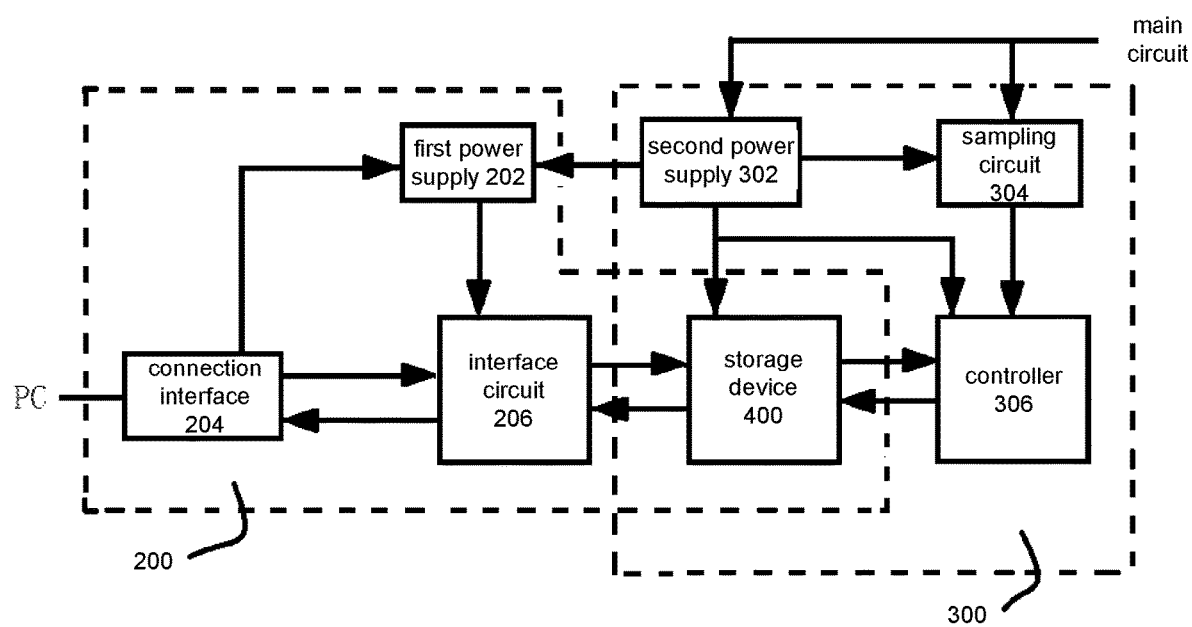
FIG. 2 is a structural schematic diagram of a data transmission apparatus of circuit breaker controller according to an embodiment of the present invention.

According to FIG. 2, FIG. 2 is a structural schematic diagram of a data transmission apparatus of circuit breaker controller according to an embodiment of the present invention. The data transmission apparatus of circuit breaker controller comprises a first component 200 and a second component 300. The first component has a first power supply and the second component has a second power supply. The first component and the second component share a storage device. The second component is connected to a main circuit of the circuit breaker controller, the second component collects parameters of the main circuit and stores the parameters in the storage device, the second power supply powers the second component and is powered by the main circuit. The first component is connected to a communication device, the first component establishes data transmission between the communication device and the storage device, the first power supply powers the first component and is powered by an external power supply. The second power supply is connected to the first power supply and transmits a control signal to the first power supply.

Continue with FIG. 2, the second component 300 comprises the second power supply 302, a sampling circuit 304, a controller 306 and the storage device 400. The second power supply 302 is connected in the main circuit of the circuit breaker controller. The second power supply 302 supplies power to each element of the second component when the main circuit is switched on. The sampling circuit 304 is connected to the main circuit of the circuit breaker controller, and the sampling circuit 304 collects parameters of the main circuit. The parameters of the main circuit collected by the sampling circuit 304 include the current, voltage, and the like of the main circuit. The controller 306 is connected to the sampling circuit 304 and the storage device 400. The parameters collected by the sampling circuit 304 are processed by the controller 306 and stored in the storage device 400.

The first component 200 comprises the first power supply 202, a connection interface 204, an interface circuit 206 and the storage device 400. The storage device 400 belongs to both the first component 200 and the second component 300.

Alternatively, the first component 200 and the second component 300 share the storage device 400. It should be noted that the first component 200 and the second component 300 are relatively virtual concepts, and the first component 200 and the second component 300 are represented by dashed boxes in the drawings. The first component 200 and the second component 300 each include several physical elements and the physical elements are divided to be the first and second components according to the implemented functions. The storage device 400 is drawn into both the first component and the second component. The storage device 400 may be implemented by a non-volatile storage. For a comprehensive consideration of the application environment (capacity, access speed requirements), the storage device 400 typically employs a solid-state storage such as a flash memory. In one embodiment, the storage device 400 employs a NAND type non-volatile storage. The first power supply 202 is powered by the external power supply through the connection interface 204, and the first power supply 202 supplies power to each element of the first component. The connection interface 204 is connected to the communication device and/or the external power supply. The interface circuit 206 is connected to the first power supply 202, the connection interface 204 and the storage device 400. The first power supply 202 supplies power to the storage device 400 through the interface circuit 206, the connection interface 204 and the interface circuit 206 establish data transmission between the communication device and the storage device 400. In one embodiment, the connection interface 204 is a USB interface and the interface circuit 206 is a USB interface circuit. The USB interface and the USB interface circuit have dual functions of data transmission and power transmission. Therefore, through the USB interface and the USB interface circuit, the data transmission between the communication device and the storage device can be realized, and the first power supply 202 can be powered by the external power supply. In one embodiment, the communication device is a PC. The PC can provide external power to the first power supply 202 through the USB interface thereon, and can perform data transmission through the USB interface to acquire data from the storage device 400. These data are parameters of the main circuit collected by the sampling circuit.

In the process when the first component 200 communicates with the communication device, its working principle is similar to a memory connected via a USB interface, such as a USB flash drive. After the connection interface 204 (USB interface) is connected to the corresponding interface (USB interface) on the communication device, the first power supply 202 is connected to the external power supply (the external power supply is also provided by the USB interface on the communication device) through the connection interface 204. The first power supply 202 starts operation to power the interface circuit 206 and storage circuit 400. A data transmission path is established among the communication device, the connection interface, the interface circuit, and the storage circuit, and the communication device is able to access the storage circuit. In one embodiment, in consideration of the operation mode, the communication device can only read data in the storage device through the connection interface and the interface circuit, and cannot perform write operation on the storage device, so the communication device (PC) cannot modify the data in the storage device. The function of limiting write operation can be implemented by adding a write protection circuit to the interface circuit 206. In addition, an encryption circuit can be added in the interface circuit 206 so that the communication device needs to input a password when accessing the storage device to improve the security of data access.

Since the storage device 400 belongs to both the first component and the second component, the interface circuit in the first component and the controller in the second component can both access the data in the storage device 400. In order to prevent conflicting operations on the storage device 400, embodiment of the present invention set the following manner to avoid conflicting operations on the storage device: The second power supply transmits a control signal to the first power supply when the controller is in communication with the storage device, the first power supply is then switched off to disconnect the interface circuit and the storage device. Since the first component has only read authority to the storage device while the second component has full authority including both read and write to the storage device, the access to the storage device of the first component is limited when the controller of the second component is in operation to the storage device. According to an embodiment of the present invention, the limitation of the access of the first component to the storage device is achieved by the control of the first power supply. When the controller is in communication with the storage device, the second power supply transmits a control signal to the first power supply, so that the first power supply stops operation. When the first power supply stops operation, the interface circuit no longer works, so the data transmission path among the communication device, the connection interface, the interface circuit and the storage circuit is disconnected.

A data transmission method performed by the data transmission apparatus of circuit breaker controller illustrated in FIG. 2 is as follows:

Collecting parameters of the main circuit and storing the parameters in a storage device, the collecting and storing is powered by a second power supply and the second power supply is powered by the main circuit. This step is performed by the second component illustrated in FIG. 2.

Establishing data transmission between a communication device and the storage device, the data transmission is powered by a first power supply and the first power supply is powered by an external power supply. This step is performed by the first component illustrated in FIG. 2.

The above two steps are independent, and there is no sequential relationship, but as described above, in order to prevent conflicting operations on the storage device, the data transmission method adopts the following manner: During the process of storing the parameters to the storage device, the second power supply transmits a control signal to the first power supply. The first power supply is then switched off to disconnect the data transmission between the communication device and the storage device.

In one embodiment, a communication device, such as a PC, is connected to the storage device via a connection interface and an interface circuit to establish data transmission with the storage device. The first power supply is connected to an external power supply through the connection interface. The connection interface may be a USB interface, and the interface circuit may be a USB interface circuit. Since the USB can provide both data transmission and power transmission, the power supply to the first power supply and the data transmission of the communication device can be simultaneously realized by the USB. For example, the PC can use the USB interface to simultaneously supply the first power supply as an external power source, and read data from the storage device.

According to the data transmission method of circuit breaker controller of the present invention, the second power supply obtains power when the main circuit of the circuit breaker controller is switched on. Under the control of the controller, the sampling circuit collects the parameters of the main circuit, the controller processes the parameters and stores them in the storage device. When it is necessary to read data from the storage device, a communication device such as a PC is connected through the connection interface. After connecting to the PC, the first power supply is powered through the connection interface. At this time, if the controller is not in operation to the storage device, the second power supply does not transmit the control signal to the first power supply. The first power supply operates normally and the PC can read data from the storage device through the connection interface and the interface circuit. If the controller is in operation to the storage device, the second power supply transmits the control signal to the first power supply. The first power supply is stopped, and the PC cannot read data from the storage device through the connection interface and the interface circuit. If the main circuit fails and is disconnected, the second power supply loses power and does not work. At this time, because the control signal transmitted by the second power supply is not received, the first power supply can still operate normally by relying on the external power supply. The PC can read data from the storage device through the connection interface and the interface circuit.

In one embodiment, the authority of the communication device can be set by adding a write protection circuit in the interface circuit, so that the communication device can only read the data in the storage device, but cannot modify the date in the storage device by performing the write operation. It is also possible to set a password by adding an encryption circuit to the interface circuit to improve the security of access of the communication circuit to the storage device.

Figure 3:
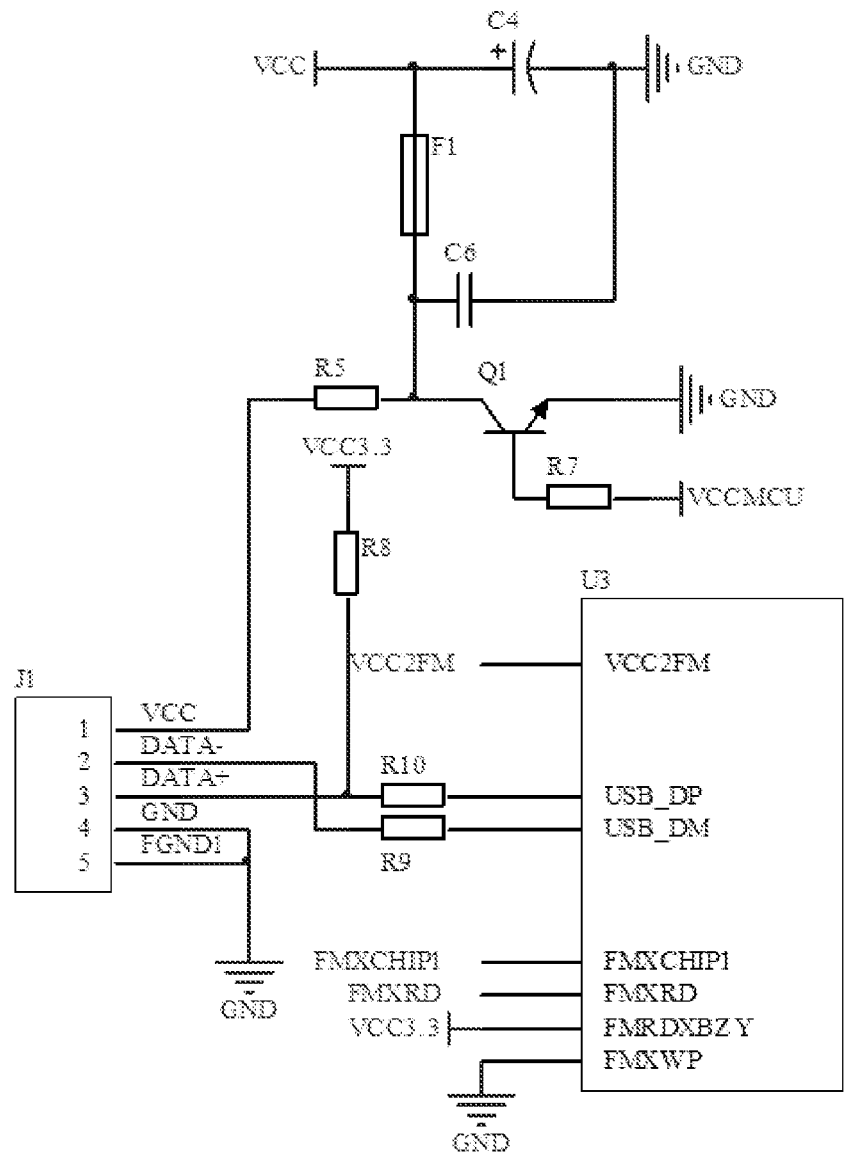
FIG. 3 is a circuit diagram of a first component of a data transmission apparatus of circuit breaker controller according to an embodiment of the present invention.

A specific implementation circuit of the data transmission apparatus of circuit breaker controller according to the present invention will now be described. Referring to FIG. 3, FIG. 3 is a circuit diagram of a first component of a data transmission apparatus of circuit breaker controller according to an embodiment of the present invention. In FIG. 3, chip U3 is the interface circuit, chip J1 is the connection interface, and VCC is the input terminal of the first power supply. The input terminal VCC of the first power supply is connected to the power supply pin (pin No. 1, pin name VCC) of the connection interface J1 through the pull-up resistor R5, and the input terminal VCC of the first power supply is also connected to the collector of the transistor Q1. The emitter of the transistor Q1 is grounded to GND. The base of the transistor Q1 is connected to the output terminal VCCMCU of the second power supply. The second power supply outputs a control signal to the first power supply through the output terminal VCCMCU and the transistor Q1. When the second component is collecting and processing data and writing data to the storage device, the output terminal VCCMCU of the second power supply outputs a high level, the transistor Q1 is switched on, and the input terminal VCC of the first power supply is grounded, so that the first power supply does not work. When the second component is not in operation, the storage device can be operated by the first component, the output terminal VCCMCU of the second power supply outputs a low level, the transistor Q1 is switched off, and the input terminal VCC of the first power supply is connected to the power supply pin of connection interface J1 through the pull-up resistor R5. At this time, if the connection interface (USB interface)

is connected to the external power supply, VCC will output a high level, so that the first power supply starts to work.

The write protection control pin FMRDXBZY of the chip U3 of the interface circuit is connected to VCC3.3 to input a high level. The write protection control pin FMXWP of the chip U3 of the interface circuit is connected to GND to input a low level. The write protection control pin FMRDXBZY of the chip U3 of the interface circuit is connected to the high level, while the FMXWP is connected to the low level, so that the chip U3 of the interface circuit is in a state that the chip U3 can read the chip U2 of the storage device at any time, but cannot write to chip U2. As described above, the interface circuit of the present invention has only the read permission for the storage device, and there is no authority to write. Therefore, the chip U3 of the interface circuit does not perform operations such as erasing or writing to the chip U2 of the storage device, only read operations will be performed. The chip U2 of the storage device is always in a standby state for a read command of the chip U3 of the interface circuit, while a write command is not accepted. Therefore, the FMRDXBZY pin connecting to the high level and the FMXWP pin connecting to the low level forms the write protection circuit of the chip U3 of the interface circuit.

In FIG. 3, auxiliary components are further connected between the input terminal VCC of the first power supply and the ground GND. The auxiliary components comprise: a fuse F1, a capacitor C4 and a capacitor C6. These auxiliary components serve the functions of protection and isolation. Connection interface J1 has a total of 5 pins. In addition to the above-mentioned pin No. 1, it also includes pin No. 2 of DATA−, pin No. 3 of DATA+, pin No. 4 of GND, and pin No. 5 of FGND. The chip U3 of the interface circuit also includes the following pins: VCC2FM, USB_DP, USB_DM, FMXCHIP1, FMXRD. The DATA− pin of J1 is connected to the USB_DM pin of U3 through the resistor R9. The DATA+ pin of J1 is connected to the USB_DP pin of U3 through the resistor R10. The DATA+ pin of J1 is also connected to VCC3.3 through the resistor R8. Pin No. 4 of GND and Pin No. 5 of FGND are grounded to GND. The VCC2FM pin of U3 is connected to the VCC2FM signal terminal (will be further described in company with chip U2 of FIG. 4). The FMXCHIP1 pin of U3 is connected to the FMXCHIP1 signal terminal (will be further described in company with chip U2 of FIG. 4), and the FMXRD pin of U3 is connected to the FMXRD signal terminal (which will be further described in company with chip U2 of FIG. 4). These wiring manners are similar to the general USB interface and USB interface circuit, and will not be described in detail here.

Figure 4:
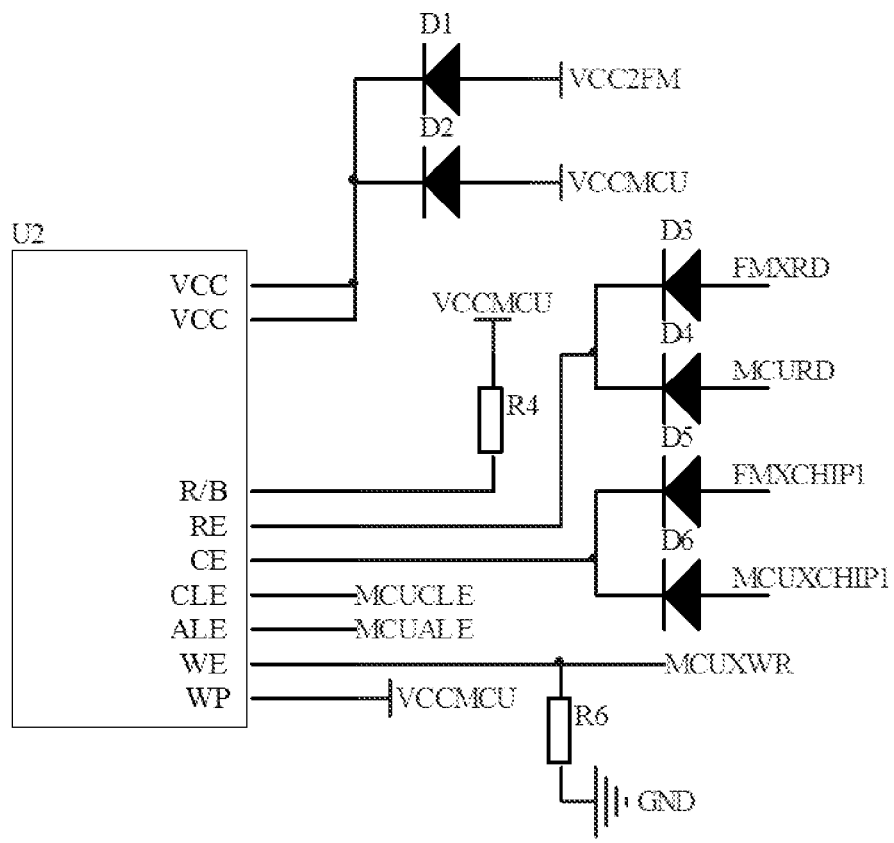
FIG. 4 is a circuit diagram of a storage device of a data transmission apparatus of circuit breaker controller according to an embodiment of the present invention.

FIG. 4 is a circuit diagram of a storage device of a data transmission apparatus of circuit breaker controller according to an embodiment of the present invention. The chip U2 in FIG. 4 is the chip of the storage device. The power supply input terminal VCC of the chip U2 of the storage device (two pins VCC constitute the power input terminal of the chip U2). The power input terminal VCC of the chip U2 is connected to the VCC2FM signal terminal through the first diode D1, the VCC2FM signal terminal is connected to the VCC2FM pin of the chip U3, and the VCC2FM pin is the output power supply pin of the chip U3. The power supply input terminal VCC of the chip U2 is also connected to the output terminal VCCMCU of the second power supply via the second diode D2. Through the above connection manner, either the first power supply or the second power supply can supply power to the chip U2. Specifically, when the second component is collecting and processing data and writing data to the storage device, the output terminal VCCMCU of the second power supply outputs a high level, and the power input terminal VCC of the chip U2 is powered by VCCMCU through the second diode D2. In combination with the above description, when VCCMCU outputs a high level, the first power supply is switched off and the chip U3 is not working, so the VCC2FM pin of the chip U3 output a low level. When the second component is not working, VCCMCU outputs a low level. As described above, when VCCMCU is at a low level, the first power supply works according to whether the USB interface is connected. When the USB interface is connected, the first power supply works and the chip U3 also works, and the VCC2FM pin of the chip U3 outputs a power level (a high level). At this time, the VCC of the chip U2 is powered by the VCC 2FM through the first diode D1.

The read data enable pin RE of chip U2 is connected to the FMXRD signal terminal through the third diode D3, the FMXRD signal terminal is connected to the FMXRD pin of the chip U3, and the FMXRD pin is the read enable control pin of the chip U3. The read data enable pin RE of the chip U2 is also connected to the MCURD signal terminal through the fourth diode D4, and the MCURD signal terminal is connected to the read enable control pin MCURD of the MCU chip of the controller (the MCU chip is not shown). The chip select signal pin CE of the chip U2 is connected to the FMXCHIP1 signal terminal through the fifth diode D5, the FMXCHIP1 signal terminal is connected to the FMXCHIP1 pin of the chip U3, and the FMXCHIP1 pin is the chip select output control terminal FMXCHIP1 of the chip U3. The chip select signal pin CE of the chip U2 is also connected to the MCUXCHIP1 signal terminal through the sixth diode D6, and the MCUXCHIP1 signal terminal is connected to the chip select output control pin MCUXCHIP1 of the MCU chip of the controller (the MCU chip is not shown). Through the above connection manner, the chip U3 of the interface circuit in the first component or the MCU chip of the controller in the second component can perform the chip selection operation and the data reading operation on the chip U2 of the storage device. Similar to the situations described above, when the second component is collecting and processing data and writing data to the storage device, that is, when the MCU chip is operating on the chip U2, the second power supply controls the first power supply to be switched off, so the chip U3 does not work, the FMXCHIP1 pin does not generate a chip select signal, and the FMXRD pin does not generate an enable signal. The CE pin of the chip U2 receives the MCUXCHIP1 chip select signal through the sixth diode D6, selects the MCU chip to communicate with the chip U2, and the RE pin of the chip U2 receives the MCURD signal through the fourth diode D4 and is read by the MCU chip. When the second component is not working, the MCU chip does not work, MCUXCHIP1 does not generate the chip select signal, and the MCURD pin does not generate the enable signal. At this time, when the chip U3 is working, the CE pin of the chip U2 receives the FMXCHIP1 chip select signal through the fifth diode D5, and the chip U3 (the interface circuit) is selected to communicate with the chip U2, and the RE pin of the chip U2 is read by the chip U3 by receiving the FMXRD signal through the third diode D3. With the above arrangement, there is no case where the chip U2 communicates with both the chip U3 and the MCU chip at the same time.

The write protection pin WP of the chip U2 is connected to the output terminal VCCMCU of the second power supply. The second power supply is the power supply of the second component. When the output of the second power supply outputs a high level, the write protection pin WP of the chip U2 receives the operation level and allows a write operation. When the output of the second power supply outputs a low level, the write protection pin WP of the chip U2 does not receive the operation level and thus the write operation is not allowed. By connecting the write protection pin WP of the chip U2 to the output of the second power supply, only the second component has the authority of write to the storage device, and the first component does not have the authority of write. When both the main circuit and the controller are working properly, data needs to be written to the storage device, and the write protection pin of the storage device outputs a high level to allow the write operation. When the main circuit is not working, the second component does not work, and the first component only has read permission, so the write protection pin of the storage device outputs a low level and the write operation is not allowed.

The write enable pin WE of the chip U2 is connected to the write enable control pin MCUXWR of the MCU chip of the controller (the MCU chip is not shown), and is grounded to GND through the pull-down resistor R6. When the MCU chip is in the working state, the write enable pin WE of the chip U2 determines whether the write enable is performed according to the control signal of the write enable control pin MCUXWR of the MCU chip. When the MCU chip is not working, the write enable pin WE of the chip U2 is grounded to input a low level, and the write operation cannot be performed at this time.

The state indication signal pin R/B of the chip U2 is connected to the output terminal VCCMCU of the second power supply through the pull-up resistor R4, and the state indication signal pin R/B of the chip U2 is also connected to the IO port of the MCU chip (the connection is not shown). When the chip U2 is in a busy state, it outputs a low level, the low level is sent to the IO port of the MCU chip, and the MCU chip is standby. When the chip U2 is in the idle state, the output is a high level, the high level is sent to the IO port of the MCU chip, and the MCU chip can perform various operations.

The command latch control pin CLE of the chip U2 is connected to the MCUCLE signal terminal, and the MCUCLE signal terminal is connected to the command latch control pin MCUCLE of the MCU chip. The address latch control pin ALE of the chip U2 is connected to the MCUALE signal terminal, and the MCUALE signal terminal is connected to the address latch control pin MCUALE of the MCU chip.

Figure 5:
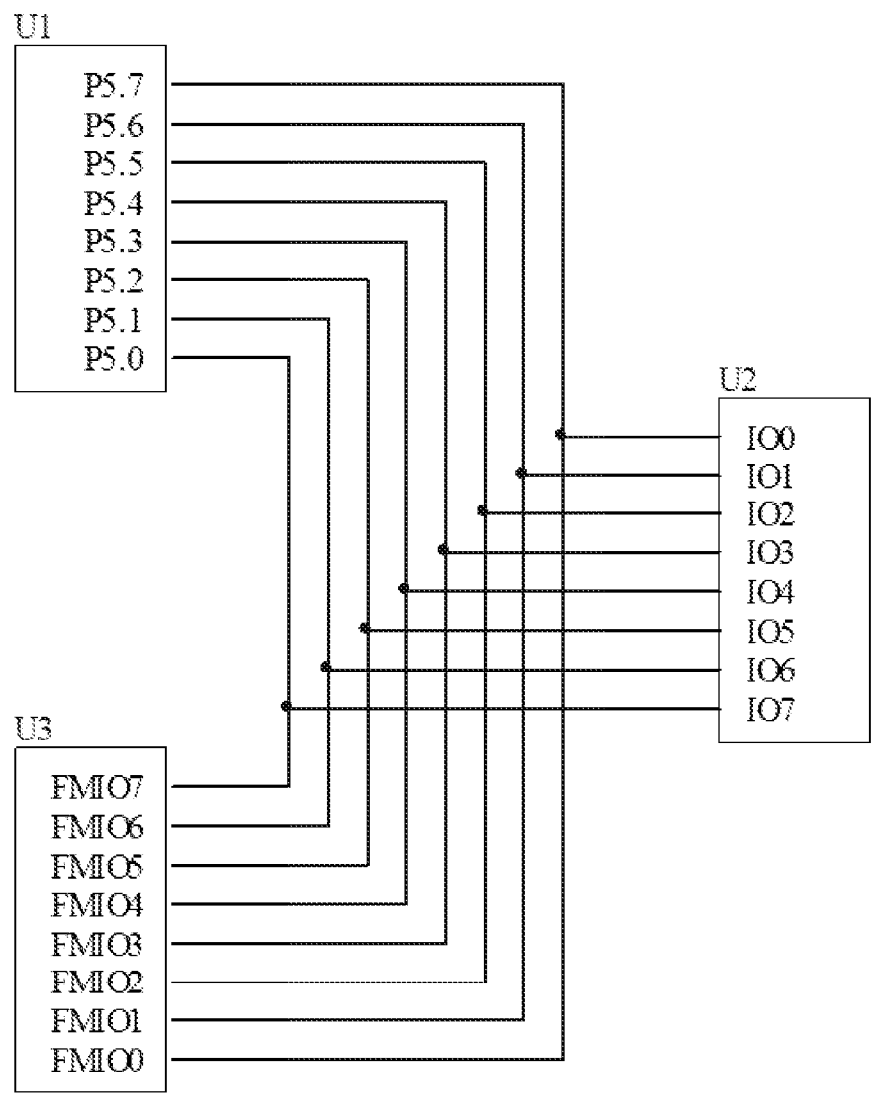
FIG. 5 illustrates a pin connection schematic diagram of a controller, a storage device, and an interface circuit of a data transmission apparatus of circuit breaker controller according to an embodiment of the present invention.

FIG. 5 illustrates a pin connection schematic diagram of a controller, a storage device, and an interface circuit of a data transmission apparatus of circuit breaker controller according to an embodiment of the present invention. In one embodiment, the MCU chip U1 of the controller deploys MSP430F247TPMR, the chip U3 of the interface circuit deploys AU9380-48PIN, and the chip U2 of the storage device deploys K9F5608U0A-YCB0. The P5.0~P5.7 external I/O ports of the MCU chip U1 are respectively connected in parallel with the chip U3 pins FMIO7~FMIO0 of the interface circuit, and are connected to the IO7~IO0 pins of the chip U2 of the storage device.

The data transmission apparatus of circuit breaker controller of the present invention comprises two components, each of which has an independent power supply but share a common storage device. The component connected to a main circuit is powered by the main circuit, the component collects parameters of the main loop and stores them in the storage device. The component connected to a communication device uses a universal interface, the component is powered by an external power supply and is able to provide data transmission over a common interface. A data transmission device of the circuit breaker controller is capable of acquiring data in the storage device by means of an external power supply in the case where the main circuit is disconnected, and can use a universal interface such as USB to facilitate field operation.

The above embodiments are provided to those skilled in the art to realize or use the invention, under the condition that various modifications or changes being made by those, skilled in the art without departing the spirit and principle of the invention, the above embodiments may be modified and changed variously, therefore the protection scope of the invention is not limited by the above embodiments, rather, it should conform to the maximum scope of the innovative features mentioned in the Claims.

What is claimed is:

1. A data transmission apparatus of circuit breaker controller, comprising a first component having a first power supply and a second component having a second power supply, wherein the first component and the second component share a storage device;

the second component is connected to a main circuit of the circuit breaker controller, the second component collects parameters of the main circuit and stores the parameters in the storage device, the second power supply powers the second component and is powered by the main circuit;

the first component is connected to a communication device, the first component establishes data transmission between the communication device and the storage device, the first power supply powers the first component and is powered by an external power supply, the second power supply is connected to the first power supply and transmits a control signal to the first power supply;

an input end of the first power supply is connected to ground through a switch transistor, the input end of the first power supply is further connected to a supply end of the connection interface, and an output end of the second power supply is connected to the switch transistor;

the output end of the second power supply outputs a high level, and the switch transistor is switched on, the input end of the first power supply is connected to ground so that the first power supply is switched off;

the output end of the second power supply outputs a low level, and the switch transistor is switched off, the input end of the first power supply is connected to the supply end of the connection interface, and the first power supply is controlled by the supply end of the connection interface.

2. The data transmission apparatus of circuit breaker controller according to claim 1, wherein the second component comprises: the second power supply, a sampling circuit, a controller and the storage device;

the second power supply is connected in the main circuit of the circuit breaker controller, and the second power supply supplies power to each element of the second component when the main circuit is switched on;

the sampling circuit is connected to the main circuit of the circuit breaker controller, and the sampling circuit collects parameters of the main circuit;

the controller is connected to the sampling circuit and the storage device, the parameters collected by the sampling circuit are processed by the controller and stored in the storage device.

3. The data transmission apparatus of circuit breaker controller according to claim 2, wherein
the first component comprises: the first power supply, a connection interface, an interface circuit, and the storage device;
the first power supply is powered by the external power supply through the connection interface, and the first power supply supplies power to each element of the first component;
the connection interface is connected to the communication device and/or the external power supply;
the interface circuit is connected to the first power supply, the connection interface and the storage device, the first power supply supplies power to the storage device through the interface circuit, the connection interface and the interface circuit establish data transmission between the communication device and the storage device.

4. The data transmission apparatus of circuit breaker controller according to claim 3, wherein the second power supply transmits a control signal to the first power supply when the controller communicates with the storage device, the first power supply is switched off so that the interface circuit is disconnected with the storage device.

5. The data transmission apparatus of circuit breaker controller according to claim 4, wherein the communication device can only read data in the storage device through the connection interface and the interface circuit.

6. The data transmission apparatus of circuit breaker controller according to claim 5, wherein a first write protection control pin of a chip of the interface circuit is provided with a high level and a second write protection control pin is provided with a low level so as to form a writing protection circuit, so that the interface circuit can only read the storage device.

7. The data transmission apparatus of circuit breaker controller according to claim 5, wherein
a power input end of a chip of the storage device is respectively connected to the output end of the second power supply and an output power supply pin of the chip of the interface circuit through respective diodes;
the output end of the second power supply outputs a high level, and supplies power to the chip of the storage device through the diode, the first power supply is switched off, and the output power supply pin of the chip of the interface circuit does not output a power supply level;
the output end of the second power supply outputs a low level, the first power supply is switched on, and the output power supply pin of the chip of the interface circuit outputs the power supply level to supply power to the chip of the storage device.

8. The data transmission apparatus of circuit breaker controller according to claim 5, wherein
chip select signal pins of the chip of the storage device are respectively connected to a chip select output control pin of the controller and a chip select output control pin of the chip of the interface circuit through respective diodes;
the output end of the second power supply outputs a high level, the first power supply is switched off, the chip select output control pin of the controller outputs a chip select signal, while the chip select output control pin of the chip of the interface circuit does not output a chip select signal, so that the chip of the storage device selects to communicate with the controller;
the output end of the second power supply outputs a low level, the first power supply is switched on, the chip select output control pin of the controller does not output the chip select signal, while the chip select output control pin of the chip of the interface circuit outputs the chip select signal, so that the chip of the storage device selects to communicate with the interface circuit.

9. The data transmission apparatus of circuit breaker controller according to claim 5, wherein
read enable control pins of the chip of the storage device are respectively connected to a read enable control pin of the controller and a read enable control pin of the chip of the interface circuit through respective diodes;
the output end of the second power supply outputs a high level, the first power supply is switched off, the read enable control pin of the controller outputs a read enable signal, while the read enable control pin of the chip of the interface circuit does not output a read enable signal, so that the chip of the storage device is read by the controller;
the output end of the second power supply outputs a low level, the first power supply is switched on, the read enable control pin of the controller does not output the read enable signal, while the read enable control pin of the chip of the interface circuit outputs the read enable signal, so that the chip of the storage device is read by the chip of the interface circuit.

10. The data transmission apparatus of circuit breaker controller according to claim 5, wherein
a write protection pin of the chip of the storage device is connected to the output end of the second power supply;
the output end of the second power supply outputs a high level, the write protection pin of the chip of the storage device is connected to the high level, and the chip of the storage device allows writing;
the output end of the second power supply outputs a low level, the write protection pin of the chip of the storage device is connected to the low level, and the chip of the storage device does not allow writing.

11. The data transmission apparatus of circuit breaker controller according to claim 5, wherein
a write enable pin of the chip of the storage device is connected to a write enable control pin of the controller and is connected to ground through a resistor;
the output end of the second power supply outputs a high level, the write enable pin of the chip of the storage device determines whether to enable writing according to a control signal of the write enable control pin of the controller;
the output end of the second power supply outputs a low level, the write enable pin of the chip of the storage device is grounded and is inputted with a low level, the chip of the storage device does not enable writing.

12. The data transmission apparatus of circuit breaker controller according to claim 5, wherein
a state indication signal pin of the chip of the storage device is connected to the output end of the second power supply through a resistor, and is also connected to an IO port of the controller;
the chip of the storage device is in a busy state, a low level is outputted and provided to the IO port of the controller, and the controller is standby;

the chip of the storage device is in an idle state, a high level is outputted and provided to the IO port of the controller, and the controller enables operation.

13. The data transmission apparatus of circuit breaker controller according to claim 5, wherein
 a command latch control pin of the chip of the storage device is connected to a command latch control pin of the controller;
 an address latch control pin of the chip of the storage device is connected to an address latch control pin of the controller.

14. A data transmission method of circuit breaker controller, comprising:
 collecting parameters of the main circuit and storing the parameters in a storage device, the collecting and storing is powered by a second power supply and the second power supply is powered by the main circuit;
 establishing data transmission between a communication device and the storage device, the data transmission is powered by a first power supply and the first power supply is powered by an external power supply;
 connecting an input end of the first power supply to ground through a switch transistor, connecting the input end of the first power supply to a supply end of the connection interface, and connecting an output end of the second power supply to the switch transistor;
 outputting a high level from the output end of the second power supply, switching on the switch transistor, and connecting the input end of the first power supply to ground so that the first power supply is switched off;
 outputing a low level from the output end of the second power supply, switching off the switch transistor, connecting the input end of the first power supply to the supply end of the connection interface, and controlling the first power supply by the supply end of the connection interface.

15. The data transmission method of circuit breaker controller according to claim 14, wherein
 the communication device is connected to the storage device through a connection interface and an interface circuit, and the data transmission is established between the communication device and the storage device;
 the first power supply is connected to the external power supply through the connection interface.

16. The data transmission method of circuit breaker controller according to claim 15, wherein the connection interface is a USB interface, and the interface circuit is a USB interface circuit.

17. The data transmission method of circuit breaker controller according to claim 14, wherein during the storage of the parameters to the storage device, the second power supply transmits a control signal to the first power supply, the first power supply is switched off so as to disconnect the data transmission between the communication device and the storage device.

18. The data transmission method of circuit breaker controller according to claim 14, wherein the communication device can only read data from the storage device.

* * * * *